UNITED STATES PATENT OFFICE.

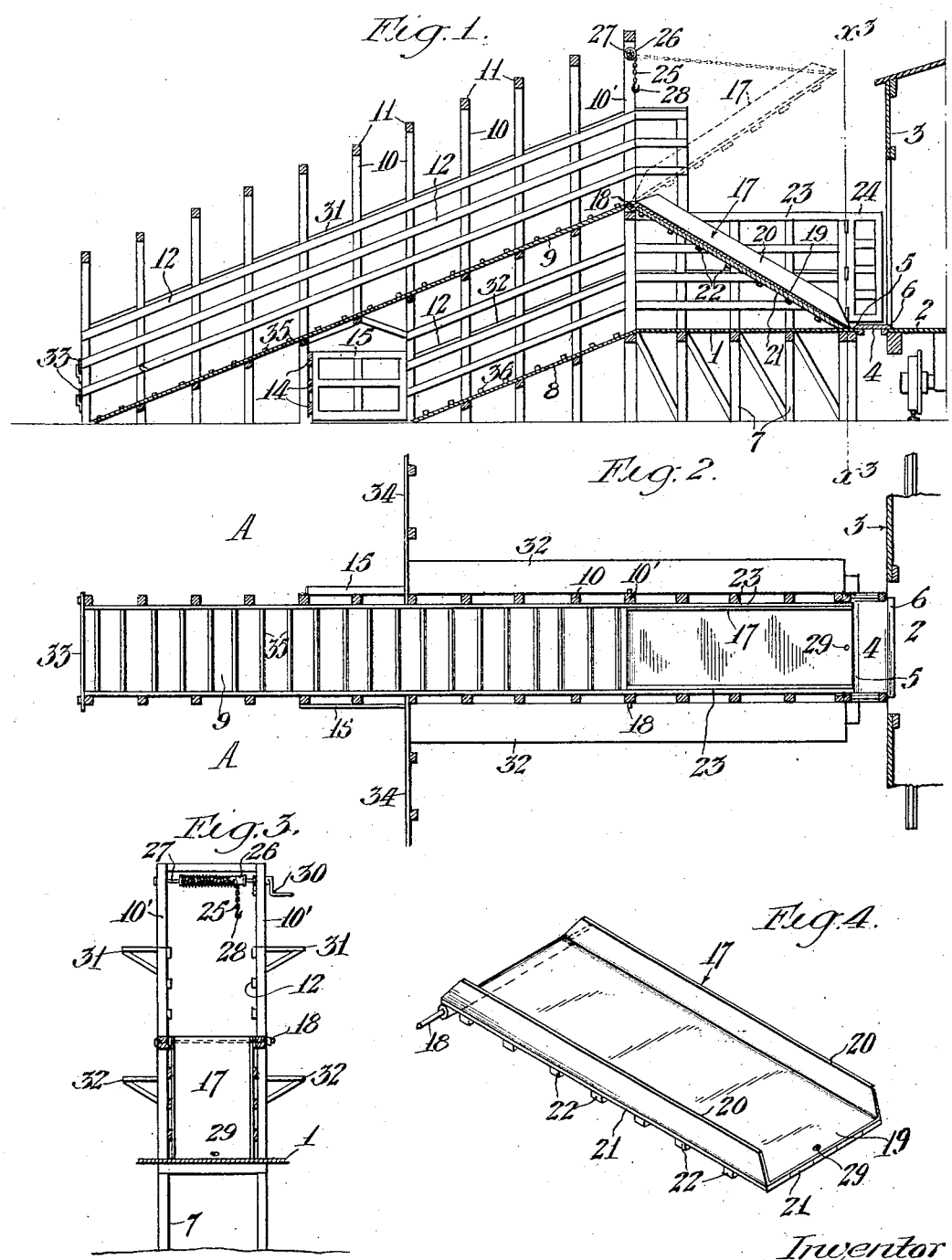

THOMAS F. DOYLE, OF SANTA ANA, CALIFORNIA.

CATTLE LOADING AND UNLOADING DEVICE.

1,235,125.  Specification of Letters Patent.  Patented July 31, 1917.

Application filed May 23, 1916. Serial No. 99,458.

*To all whom it may concern:*

Be it known that I, THOMAS F. DOYLE, a citizen of the United States, residing at Santa Ana, in the county of Orange and State of California, have invented a new and useful Cattle Loading and Unloading Device, of which the following is a specification.

My invention relates to a device adapted for the purpose of loading and unloading cattle from inclosures to railway cars for transportation, also the unloading of cattle from cars to an inclosure.

In the ordinary form of loading device, the device usually consists of a platform having an inclined approach thereto, the width of the approach and platform being just sufficient to permit the passage of one full grown animal at a time. Difficulty usually arises with such a device due to the fact that when the cattle have reached the platform it is hard to get them to enter the car, and a crowding of the cattle results, causing loss of time and considerable extra labor during the loading operation.

The principal object of my invention is to overcome this crowding, and for this purpose, instead of using a horizontal platform for the loading operation, I have constructed a device having the usual horizontal platform and inclined approach and in addition thereto have provided an inclined approach directly over the first named approach which terminates in an inclined chute, the outer end of which rests upon the horizontal platform directly in front of the doorway to the car.

Referring to the drawings, which are for illustrative purposes only:—

Figure 1 is a vertical sectional view of a device embodying my invention, showing the same in a position for loading cattle into the car.

Fig. 2 is a sectional plan view of the device shown in Fig. 1.

Fig. 3 is a vertical sectional view on the line 3—3 of Fig. 1.

Fig. 4 is a perspective view of the chute.

1 designates a horizontal platform which is of the approximate level of the floor 2 of a car 3 the gap between the outer end of the platform 1 and the floor 2 of the car being filled by the ordinary bullboard 4, one edge 5 of which overlaps the platform and the other edge 6 of the bullboard overlapping the car floor, as clearly shown in Fig. 1.

The platform 1 is supported on the usual form of timber supports indicated at 7 and is connected at its inner end by an inclined gangway 8 which may be designated as the lower or unloading gangway. Directly above the lower gangway 8 is an upper inclined gangway 9, the two gangways being spaced apart a sufficient distance to permit the free travel of cattle on the gangway 8 under the gangway 9. The gangways 8 and 9 are supported on the usual form of upright timbers indicated at 10 connected at their upper ends by cross timbers 11.

12 designates a series of planks or rails secured to the timbers 10 for the purpose of inclosing the sides of the gangways, thereby preventing the cattle from leaving the gangway, except at the ends thereof.

14 designates cross planks between two of the uprights 10 for the purpose of closing the lower end of the gangway 8, an entrance being provided to the lower gangway from the field "A" consisting of a gate 15, the uprights on the opposite side of the gangway to the gate 15 being closed by means of bars or planks 16. Pivotally mounted between the uprights 10' at the outer end of the upper gangway 9 is a loading chute 17, said pivotal mounting consisting of a shaft or bar 18. The chute 17 in the position shown in Fig. 1 inclines downwardly from the upper end of the gangway 9, the outer end of the chute 17 resting upon the horizontal platform 1, preferably close to the inner end of the bullboard 4. The chute 17 consists of sheet metal indicated at 19 having upturned sides 20, the metal 19 being reinforced by planking 21 on the bottom thereof and cleats 22 secured to the underside of the planking. Each side of the platform is closed by means of a fence 23 provided at its outer end with gates 24, which gates, in the position shown in Fig. 1, are swung into open position, thereby forming a continuation of the fence 23 to the side of the car 3. Means are provided for raising the chute which consists of a chain 25 wound upon a spool 26 on a shaft 27 mounted in the uprights 10', the chain 25 being provided with a hook 28 adapted to engage in a hole 29 in the outer end of the chute 17, the shaft 27 being operated to raise and lower the chute 17 by means of a crank 30. 31 and 32 designate platforms at each side of the structure, so that the workmen may travel along the respective gangways for the purpose of keeping the cattle in motion.

The device is used in the following manner:

In the position shown in Fig. 1, the bars 33 at the inner end of the structure are removed, thereby opening the inner end of the structure to the field "A", the field being that portion indicated inside of the fence 34. The chute 17 is lowered into the position shown in Fig. 1, and the cattle are started up the gangway 9, suitable cleats 35 being provided on the face of the gangway to provide a foothold for the cattle.

As each animal steps upon the chute 17, his fore feet slip down the chute and the animal slides down the chute over the bullboard 4 into the car, being unable to back into the gangway after his fore feet strike the downwardly inclined chute. It will be readily understood that the cattle on the gangway 9 may be kept moving forward, the outer or upper end of the gangway being kept clear by the chute due to the quick despatch of the cattle into the car as heretofore described.

When it is desired to use the device for unloading purposes, the chute is raised by means of the chain 25 and hook 28, and cattle from the car enter the platform over the bullboard 4, then pass downwardly over the gangway 8, the gangway 8 having suitable cleats 36 on its upper surface, and pass out of the structure through the gate 15.

I claim as my invention:—

1. A cattle loading device comprising a platform, a lower inclined gangway having its upper end connected to said platform, an upper inclined gangway spaced above said lower gangway, a pivotally mounted chute having its upper end adjoining the upper end of said upper chute and adapted to rest its lower end on said platform, and means for raising and lowering said chute.

2. A device for loading and unloading cattle from cars, a stationary structure, a platform thereon, an inclined lower gangway having its upper end connected to said platform, an inclined upper gangway spaced apart above said lower gangway, a chute extending from the upper end of said upper gangway to said platform, means for pivotally mounting the upper end of said chute in said structure, means for raising said chute from said platform, means for connecting said platform to the car floor, and fencing means at each side of said gangways and said platform.

3. A cattle loading device comprising a lower gangway; an inclined upper gangway above said lower gangway; an inclined chute forming a continuation of said upper gangway and having its lower end resting upon said lower gangway; and means for raising and lowering the outer end of said chute.

In testimony whereof, I have hereunto set my hand at Brawley, California, this 13th day of May, 1916.

THOMAS F. DOYLE.

Copies of this patent may be obtained for five cents each, by addressing the "Commissioner of Patents, Washington, D. C."